F. A. SUHRE.
SHOCK ABSORBER FOR AUTOMOBILES AND OTHER VEHICLES.
APPLICATION FILED JUNE 30, 1920.
1,411,130.
Patented Mar. 28, 1922.
2 SHEETS—SHEET 1.
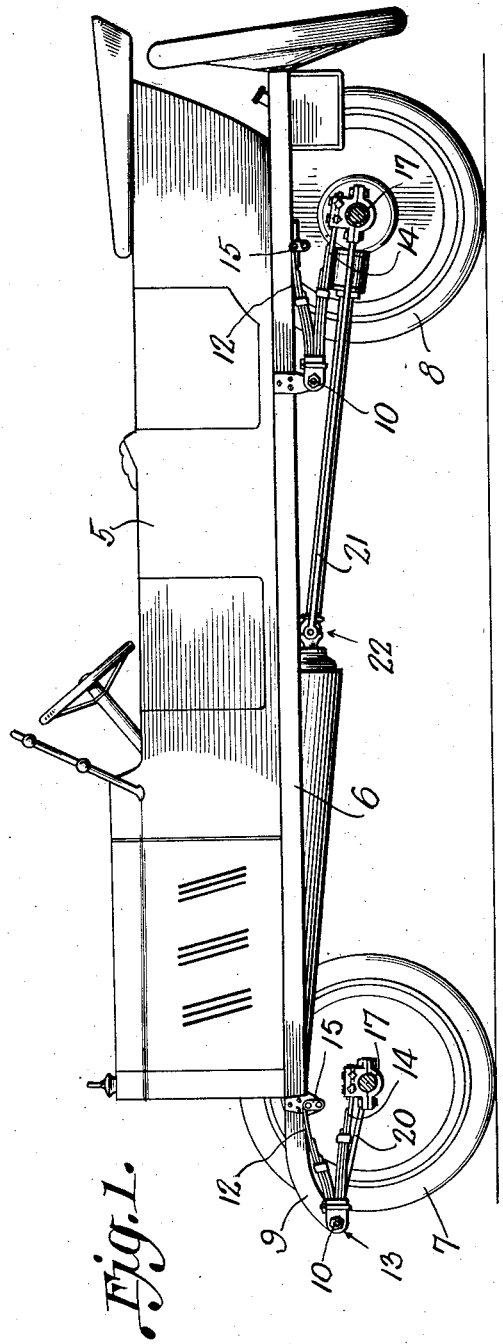
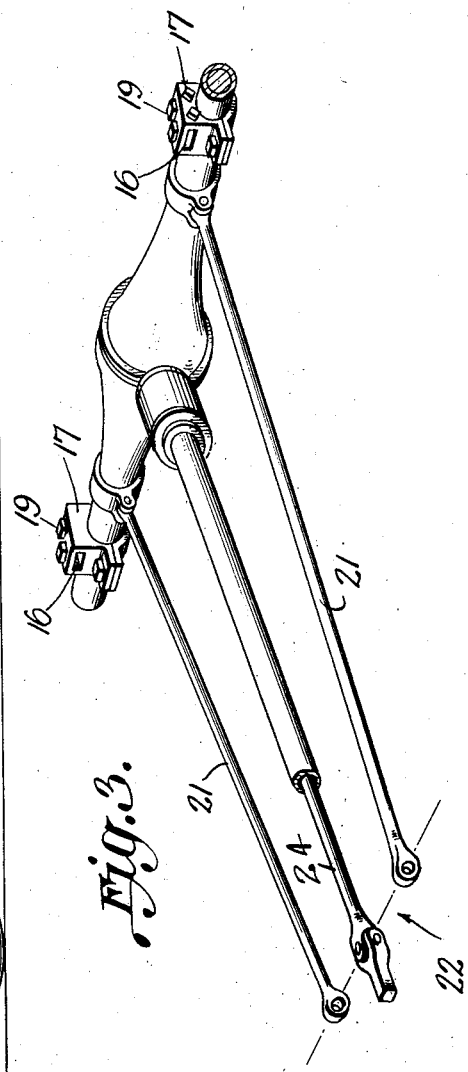
Inventor:
Frank A. Suhre,
by [signature]
Atty.

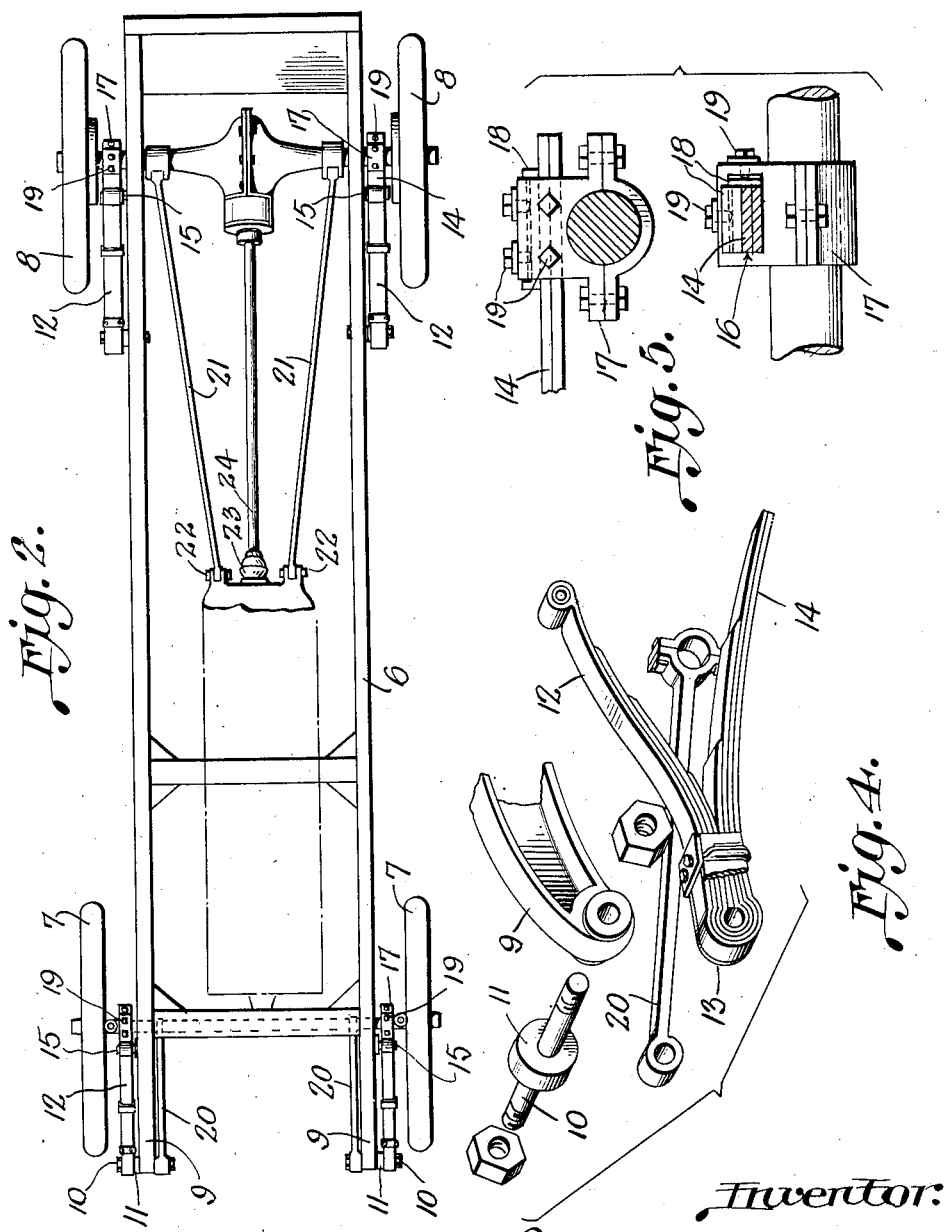

UNITED STATES PATENT OFFICE.

FRANK A. SUHRE, OF NEPONSET, MASSACHUSETTS.

SHOCK ABSORBER FOR AUTOMOBILES AND OTHER VEHICLES.

1,411,130. Specification of Letters Patent. Patented Mar. 28, 1922.

Application filed June 30, 1920. Serial No. 393,130.

*To all whom it may concern:*

Be it known that I, FRANK A. SUHRE, a citizen of the United States, residing at Neponset, in the State of Massachusetts, have invented certain new and useful Improvements in Shock Absorbers for Automobiles and other Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to means for absorbing road shocks received on the wheels of vehicles, particularly automobiles or the like, and has for its object to provide a novel and efficient spring suspension, and one easy to apply, efficient in use and cheap to manufacture.

With the above and other objects in view as may become apparent from the following disclosure, the invention consists in the novel combination of elements, construction and arrangement of parts, operation and specific features to be hereinafter enlarged upon and recited in the subjoined claims, the invention being illustrated in the accompanying drawings, wherein:

Fig. 1 is a side elevation of a vehicle illustrating the spring suspension;

Fig. 2 is a plan view of the chassis;

Fig. 3 is a detailed perspective, showing the attaching means for the rear axle;

Fig. 4 is a detailed perspective of the forward spring assembly; and

Fig. 5 is a view showing more specifically the spring attachment means.

In the drawings wherein for the purpose of illustration I have shown a preferred embodiment of my invention, and in which like reference characters refer to like parts throughout the several views, numeral 5 denotes a vehicle carried by the chassis frame 6, and supported by wheels 7 and 8.

Secured to the forward end 9 of the frame by a threaded bolt 10 and spaced therefrom by an annular shoulder 11 on said bolt, is a resilient leaf spring 12 bent upon itself to form an attaching head 13 and a diverging free end 14. The end of the upper diverging leg of the leaf spring is bushed and is attached to the frame by a free or floating connection, for instance, by shackles 15 while the end of the lower leg is secured to the axle by a float connection by being inserted through a slot 16, in the housing 17 thereon so as to slide therein. Mounted in the slot 16 are wear compensating gibs 18 adapted to be pressed against the top and side of the spring by the adjusting studs 19 so as to take up wear or lost motion.

Fixedly secured to the front axle and extending therefrom to the pivotal bolts 10 are radius rods 20 designed to steady and brace the axle and resist strains and at the same time permit free action of the springs.

Similarly secured to the rear axle are rear radius rods 21 which converge from their point of attachment to the rear axle to bearings 22 aligned with the universal joint 23 of the transmission shaft 24.

It will thus be understood that in the operation of this device the radius rods pivot and vibrate with the springs and that they take a large share of the normal pull and thrust from the load bearing wheels, thus allowing the springs greater freedom to efficiently cushion vibration.

It is to be noted that the lower leg of the spring is of greater length than the upper leg, and that the axle is thus allowed to be positioned rearwardly of the point of attachment of the upper leg of the spring to the chassis frame.

While I have described with particularity the present preferred construction and arrangement of parts, I do not limit myself thereto except as expressed in the appended claims as changes may be made in the details and also in the arrangement or position of parts without departing from essential features of the invention.

Having described my invention and set forth its merits, what I claim is:

1. In a shock absorber, the combination with a vehicle frame and axle, of a leaf-spring having diverging legs, the upper leg at its divergent end being attached to the frame and the lower leg at its divergent end to the axle, a radius rod connected at one end to the axle, and a coupling-bolt passed through the adjacent ends of the leaf-spring, radius rod and frame to join the same together.

2. In a shock absorber, the combination with a vehicle frame, axle and a universal jointed transmission shaft, of a leaf-spring having diverging legs and attached at the point of convergence of the legs to the vehicle frame, the upper and the lower legs at their divergent ends having a floating attachment, respectively, to the frame and the axle, and a radius rod connected at one end to the axle and its other end in alinement with the universal joint of the transmission shaft.

3. In a shock absorber, the combination with a vehicle frame and axle, of a leaf-spring having diverging legs attached at the point of convergence of the legs to the frame, the upper leg at its divergent end being attached to the frame, a slotted boxing connected to the axle and having the divergent end of the lower leg of the spring slidable therein, and a wear-compensating member in the boxing.

In testimony whereof I affix my signature in presence of two witnesses.

FRANK A. SUHRE.

Witnesses:
CHESTER C. CHAPMAN,
WM. E. DUNHAM.